(12) United States Patent
Juntunen

(10) Patent No.: US 7,240,603 B2
(45) Date of Patent: Jul. 10, 2007

(54) VALVE

(75) Inventor: Harri Juntunen, Joensuu (FI)

(73) Assignee: Abloy Oy, Joensuu (FI)

( * ) Notice: Subject to any disclaimer, the term of this patent is extended or adjusted under 35 U.S.C. 154(b) by 0 days.

(21) Appl. No.: 11/297,148

(22) Filed: Dec. 7, 2005

(65) Prior Publication Data
US 2006/0117525 A1   Jun. 8, 2006

(30) Foreign Application Priority Data
Dec. 8, 2004   (FI) .................................. 20041582

(51) Int. Cl.
*E05F 3/00*   (2006.01)
*F01B 31/00*   (2006.01)
(52) U.S. Cl. ........................... 91/422; 92/181 R; 16/52
(58) Field of Classification Search ................. 91/422; 92/181 R, 181 P; 16/51, 52, 58, 66
See application file for complete search history.

(56) References Cited

U.S. PATENT DOCUMENTS 2,276,338 A  *  3/1942  Potter et al. ................... 91/422
4,185,356 A  *  1/1980  Kuivalainen et al. ........... 16/52
4,349,939 A  *  9/1982  Tillmann ........................ 16/53
4,793,023 A  * 12/1988  Simpson et al. ................ 16/52
4,793,033 A     12/1988  Simpson et al.
4,999,872 A  *  3/1991  Jentsch .......................... 16/58

FOREIGN PATENT DOCUMENTS

DE        19651461        6/1998
EP         0467131        1/1992
EP         1293633        3/2003

* cited by examiner

*Primary Examiner*—Thomas E. Lazo
(74) *Attorney, Agent, or Firm*—Smith-Hill and Bedell

(57) ABSTRACT

A piston assembly for a door closer includes a piston formed with a mounting hole and a door closer valve installed with clearance in the mounting hole. The door closer valve has a body part with first and second formations at opposite respective ends of the body part for engaging opposite respective sides of the piston and retaining the valve in the mounting hole. The body part is movable in the mounting hole axially of the mounting hole. The first formation is a protruding flange for seating against the piston at the first side thereof around the mounting hole and creating a seal around the mounting hole.

7 Claims, 2 Drawing Sheets

VALVE

CROSS-REFERENCE TO RELATED APPLICATION

This application claims priority under 35 USC 119 of Finnish Patent Application No. 20041582 filed Dec. 8, 2004.

BACKGROUND OF THE INVENTION

The object of the invention is a door closer valve. Furthermore, a particular object of the invention is a door closer valve that also includes a check valve part.

A door closer includes a valve through which fluid contained in the door closer, usually oil, can flow from one side of the door closer piston to the opposite side. When the door is opened, the door closer piston presses the door closer spring. Oil will simultaneously flow through the valve to the other side of the piston. When the force of the pressed spring closes the door, the oil flows back to the opposite side through a separate flow passage having its cross-sectional area adjusted appropriately to make the door close smoothly, not abruptly. Thus the valve does not let the oil flow to the opposite side.

EP 1293633 describes such a valve solution that also includes a check valve part. When the door is closed, the check valve part opens at a certain value of oil pressure (that is, at over-pressure) which lets the oil flow to the opposite side. Appropriate dimensioning of the check valve affects the oil flow rate and therefore the rate at which the over-pressure condition is eliminated.

Known publications use a separate gasket to seal the reverse direction of the valve. In order to hold the gasket in place, a projection or cavity preferably has to be shaped in the valve body. This will cause additional costs, as will the gasket itself. However, the valve should be as inexpensive to manufacture as possible. The objective of the invention is to reduce the costs of manufacturing the valve.

SUMMARY OF THE INVENTION

In an embodiment of the invention the actual valve body is used to create a sealing surface against the body of the door closer piston without any separate gasket part. In order to make this possible, the valve body is made of a material suitable for the purpose while simultaneously fulfilling the normal characteristics required of the valve body. A suitable material is plastic. The plastic that is used to make the valve body should be mechanically durable. Since the fluid in the door closer is normally an oil, the plastic must be able to withstand prolonged exposure to oil without being degraded. For example, ABS is a suitable material.

A door closer valve embodying the invention operates as a directional control valve in the first direction (the first direction of the fluid flow in the door closer). If a valve embodying the invention additionally includes a check valve part, it will operate as a check valve in the second direction of fluid flow. A valve embodying the invention is arranged to move in the axial direction of the mounting hole in accordance with the pressure conditions within the door closer. A valve embodying the invention comprises a body part and optionally a check valve part arranged in the body part. The body part is plastic and comprises a protruding flange, one surface of which is arranged to settle against the body of the door closer piston around the mounting hole while simultaneously creating a seal around the mounting hole.

BRIEF DESCRIPTION OF THE DRAWINGS

In the following, the invention is described in more detail by reference to the enclosed drawings, in which.

DETAILED DESCRIPTION

Figure 1:
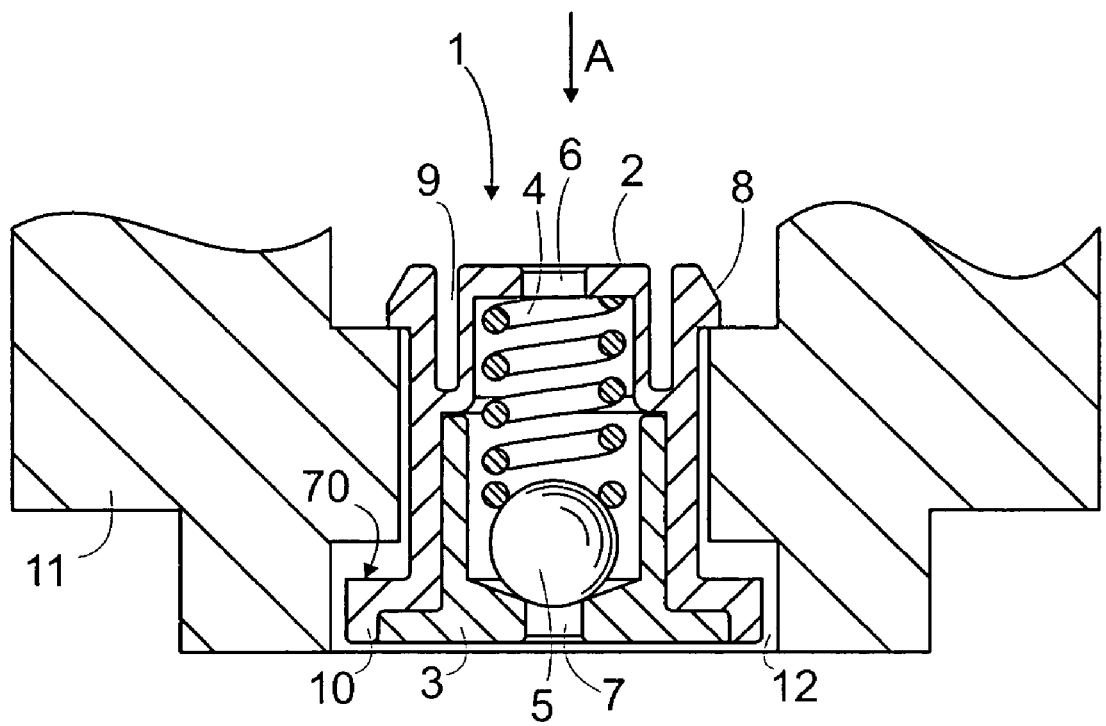
FIG. 1 illustrates a cross-section of an embodiment of the invention installed in a door closer while the door is being opened.

FIG. 1 illustrates an embodiment 1 of the invention in which it is installed into a door closer. The point of installation is a hole 12 in the piston through which the fluid in the door closer, normally a suitable type of oil, can flow from one side of the piston to another. Thus the purpose of the valve is to operate as a directional control valve. In the situation illustrated in FIG. 1, the door is being opened, which causes the fluid to flow in direction A, the first direction, through the mounting hole 12 (more precisely, the gap left between the valve 1 and the piston body 11) to the other side of the piston.

The piston body 11 is made of metal. The choice of metal depends on the type and size of the door closer. A piston for use in a door closer for light use need not be mechanically as strong as a piston for use in a door closer for heavy use.

The body of the valve in FIG. 1 comprises a first body part 2 and a second body part 3. The first body part has clips 8 in its first end for holding the valve in the mounting hole so that it cannot slip out of the hole when the door closer fluid flows in direction A. The first body part 2 is shaped at the clips 8 so that the clips will flexibly bend towards the body part when the valve is being installed in the mounting hole. There may be a slot 9 between the first body part 2 and the clips 8 as illustrated in FIG. 1. The second end of the first body part includes a flange 10 with one of its surfaces creating a sealing surface 70. When the door is being opened, the sealing surface is not pressed against the door closer's piston body 11, which allows the fluid to flow through the hole 12. The flange 10 is essentially at the end of the valve, that is, relatively close to the end or at the very end of the valve.

A cavity is arranged at the middle of the first body part 2 for fitting a flexible element 4, usually a spring, a blocking element 5 and the second body part 3. The first end of the first body part 2 includes a hole 6 going into the cavity. The second body part 3 is shaped so that it settles or fits tightly into the cavity and can be attached to the first body part 2 using a suitable attachment technique. A method such as ultrasonic welding can be used for attachment. Before the second body part 3 is attached to the first body part 2, the spring 4 and the blocking element 5 are fitted into the cavity so that the blocking element remains between the spring and the second body part 3. A cavity is also arranged in the second body part 3 for the spring 4 and the blocking element 5. Both ends of the second body part are open; the first end is sufficiently open for fitting the spring and the blocking element, and the hole 7 at the second end is sufficiently large for allowing the check valve to operate. Thus the check valve part of the valve comprises the spring 4, the blocking element 5, as well as the holes 6 and 7 in the first and second body parts, respectively, which are in communication with the cavity referred to above as illustrated in FIG. 1. Under normal circumstances, the blocking element 5 within the check valve part is pressed against the hole 7 in the second body part by the force of the spring 4, which prevents fluid flow through the check valve. Thus the holes 6 and 7 constitute passages through which the fluid can flow when necessary.

Figure 2:
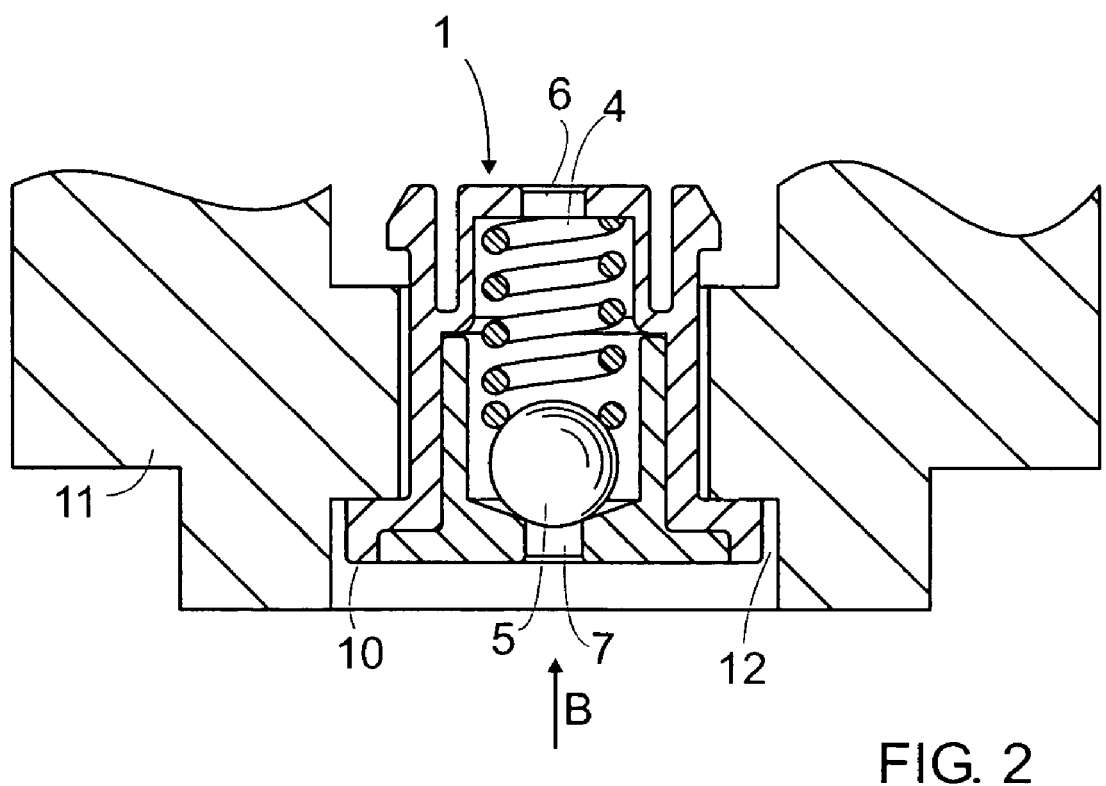
FIG. 2 illustrates a cross-section of the embodiment of FIG. 1 installed in a door closer while the door is being closed.

FIG. 2 illustrates a situation in which the door is being closed by the force of the door closer. In this case, the door closer fluid tries to flow in the direction B, that is, the second direction. The sealing surface 70 of the flange 10 of the valve 1 seats against the door closer's piston body 11, preventing fluid flow through the hole 12. Fluid will flow through the separate flow passage referred to above. The sealing surface consists of the valve body material, so there is no need for any separate gasket part. The valve body material is plastic, e.g. ABS for the reasons explained above. However, if the fluid pressure becomes high enough, the check valve part allows the fluid to flow through the valve when the blocking element 5 moves towards the spring 4, allowing the fluid to flow through the hole 7 in the second body part and the hole 6 in the first body part. This means that under normal circumstances and in embodiments without a check valve part, the valve creates an element that blocks fluid flow when the fluid tries to flow in the second direction.

Figure 3:
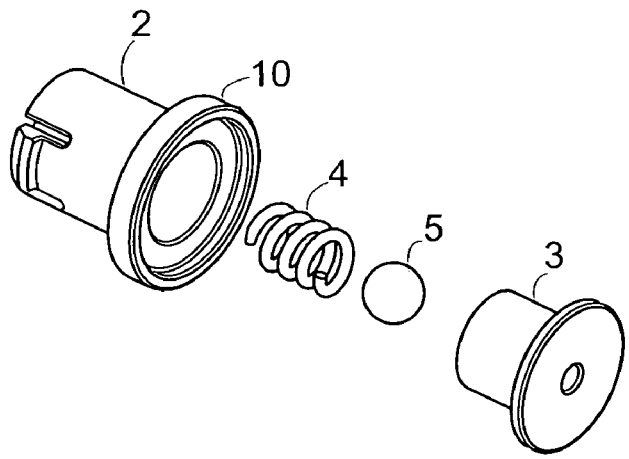
FIG. 3 illustrates the example of FIG. 1 with the parts separated.

FIG. 3 illustrates the embodiment described above with the parts separated. It is evident from the embodiment of FIGS. 1 to 3 that the flange 10 creates a right-angled projection in relation to the valve body parts, resulting in that the sealing surface 70 is also at a right angle. The flange also holds the valve in the mounting hole when the fluid tries to flow in the direction B.

However, the flange can also be shaped as a cone, placing the sealing surface at an oblique angle to the body part. In this case, the mounting hole must be funnel-shaped to accommodate the conical flange of the valve and provide sufficient sealing between the valve and the body of the door closer piston.

Figure 4:
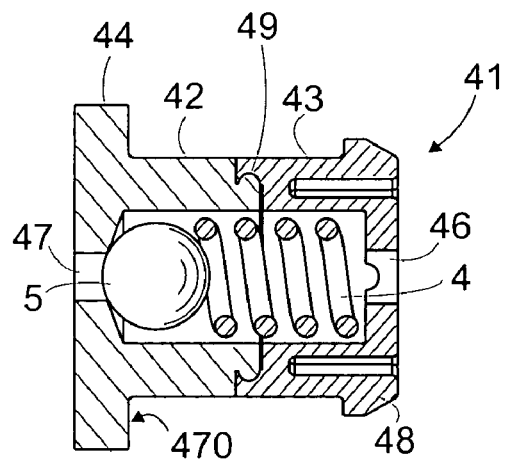
FIG. 4 illustrates a cross-section of another embodiment of the invention.
Figure 5:
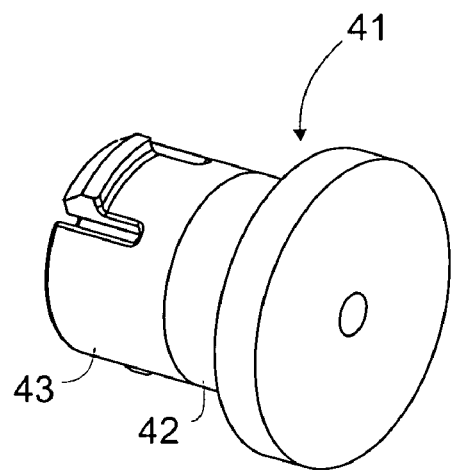
FIG. 5 illustrates the embodiment of FIG. 4.
Figure 6:
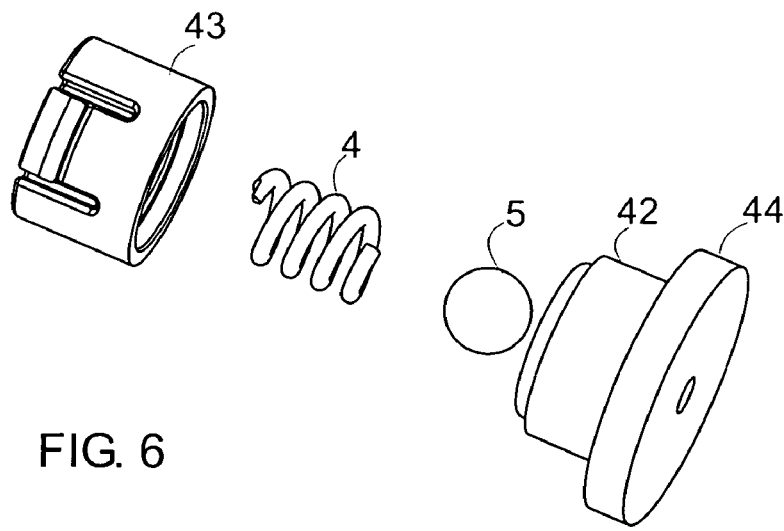
FIG. 6 illustrates the embodiment of FIG. 4 with the parts separated.

FIGS. 4, 5 and 6 illustrate another embodiment of the invention 41. In this embodiment, the valve body is divided differently from the embodiment of FIGS. 1 to 3. The body is split in two parts so that the first body part 43 constitutes the first end of the valve with clips 48 and a hole 46 for the operation of the check valve part. The second body part 42 constitutes the second end of the valve with a flange 44 and a hole 47 for the operation of the check valve part. Also in this embodiment the sealing surface 470 is at a right angle to the valve body but can also be arranged at an oblique angle to the body part. A cavity for a spring 4 and a blocking element 5 is arranged in both body parts.

In this embodiment, the body parts are attached to each other by means of a locking joint 49 comprising a projection in one of the body parts and a cavity in the opposite body part. The projection and cavity are shaped to make the joint between them as compatible as possible. In the embodiment of FIGS. 4 to 6, the locking joint can be continuous around the valve body or discontinuous in a manner similar to the clips 8 in the body.

It is evident from the described embodiments that the invention can also be implemented through other embodiments. The cross-section of the body can be circular as in the described embodiments or have another shape such as a square. The body parts can be attached to each other in different embodiments by ultrasonic welding and a locking joint as described above, by gluing or by any other appropriate method.

If an application does not require a check valve part, it can be left out of the valve according to the invention. In this case, the body part can be manufactured of a single part.

The blocking element in the check valve can be a ball as illustrated in the figures but may also have another shape such as a cylindrical element. The body of a valve according to the invention can be formed in several different ways. Likewise, the sealing surface can be shaped as desired.

It is thus evident from the examples presented above that the invention is not limited to the examples mentioned in this text but can be implemented in many other different embodiments within the scope of the inventive idea.

The invention claimed is:

1. A door closer valve that can be placed in a door closer piston and operates as a directional valve in a first direction and an element blocking the flow of the door closer fluid in a second direction, said valve being arranged to move in the axial direction of the mounting hole in accordance with the pressure conditions within the door closer, said valve comprising a body part that is made of plastic and comprises a protruding flange at one end of the body part, one of the surfaces of the flange being arranged to settle against the body of the door closer piston around the mounting hole while simultaneously creating a seal around the mounting hole, and clips at the other end of the body part to hold the body part in the mounting hole while allowing said movement, and wherein the body part is formed with passages at both ends of the body part, the body part comprises two separate parts arranged to be attached to each other, and a check valve part is arranged in the body part and comprises a flexible element and a blocking element between the passages.

2. A valve according to claim 1, characterized in that the surface of the flange that creates the seal is at a right angle to the body part.

3. A valve according to claim 1, characterized in that the surface of the flange that creates the seal is at an oblique angle to the body part.

4. A valve according to claim 1, characterized in that there are two passages, a first one in the first body part and a second one in the second body part.

5. A valve according to claim 4, characterized in that one of the body parts has a projection and the opposite body part has a cavity for creating a locking joint to attach the body parts to each other.

6. A door closer valve that can be installed in a mounting hole in a door closer piston for controlling flow of door closer fluid through the mounting hole, the valve comprising a body part that can be placed in the mounting hole, the body part having first and second formations at opposite respective ends of the body part for engaging opposite respective sides of the piston and retaining the valve in The mounting hole, wherein the first formation is a protruding flange for seating against the piston around the mounting hole and creating a seal around the mounting hole, the second formation comprises deflectable clips, the body part is formed with passages at both ends of the body part and comprises two separate parts attached to each other, and a check valve part is arranged in the body part and comprises a flexible element and a blocking element between the passages.

7. A piston assembly for a door closer, the piston assembly comprising a piston formed with a mounting hole and a door closer valve installed with clearance in the mounting hole, the door closer valve comprising a body part having first and second formations at opposite respective ends of the body part for engaging opposite respective sides of the piston and retaining the valve in the mounting hole, and wherein the body part is movable in the mounting hole axially of the mounting hole, the first formation is a protruding flange for seating against the piston at the first side thereof around the mounting hole and creating a seal around The mounting hole, the second formation comprises deflectable clips, the body part is formed with passages at both ends of the body part and comprises two separate parts attached to each other, and a check valve part is arranged in the body part and comprises a flexible element and a blocking element between the passages.

* * * * *